(12) United States Patent
Scheinert

(10) Patent No.: US 7,844,273 B2
(45) Date of Patent: Nov. 30, 2010

(54) SYSTEM FOR AND METHOD OF FOR PROVIDING DEDICATED CAPACITY IN A CELLULAR NETWORK

(75) Inventor: Stefan Scheinert, San Jose, CA (US)

(73) Assignee: LGC Wireless, Inc., San Jose, CA (US)

( * ) Notice: Subject to any disclaimer, the term of this patent is extended or adjusted under 35 U.S.C. 154(b) by 793 days.

(21) Appl. No.: 11/486,627

(22) Filed: Jul. 14, 2006

(65) Prior Publication Data

US 2008/0014948 A1 Jan. 17, 2008

(51) Int. Cl.
*H04W 36/00* (2009.01)
(52) U.S. Cl. .................................................. 455/444
(58) Field of Classification Search ................. 455/561, 455/466, 456.1–456.5, 62, 446, 423, 424, 455/436, 439, 426.2, 445, 508, 418, 552.1, 455/404.1, 417, 554.2, 458, 422.1, 564, 444, 455/408, 462, 448, 15; 370/347, 329, 328, 370/349
See application file for complete search history.

(56) References Cited

U.S. PATENT DOCUMENTS

| | | | |
|---|---|---|---|
| 3,866,121 A | 2/1975 | Nakamura et al. | |
| 4,183,054 A | 1/1980 | Patisaul et al. | |
| 4,451,916 A | 5/1984 | Casper et al. | |
| 4,611,323 A | 9/1986 | Hessenmuller | |
| 4,628,501 A | 12/1986 | Loscoe | |
| 4,654,843 A | 3/1987 | Roza et al. | |
| 4,667,319 A | 5/1987 | Chum | |
| 4,691,292 A | 9/1987 | Rothweiler | |
| 4,760,573 A | 7/1988 | Calvignac et al. | |
| 4,789,993 A | 12/1988 | Ryu | |

(Continued)

FOREIGN PATENT DOCUMENTS

DE 3707244 A 9/1988

(Continued)

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

(Continued)

*Primary Examiner*—Melody Mehrpour
(74) *Attorney, Agent, or Firm*—Fogg & Powers LLC

(57) ABSTRACT

The present invention comprises systems for and methods of providing dedicated capacity in a wireless cellular network. In an embodiment, a system for providing dedicated capacity in a cellular network comprises: a first base station positioned at a first location and being communicatively coupled to a telephone network, the first base station having an outdoor cellular antenna for forming a local coverage area, a second base station positioned at the first location and being communicatively coupled to the telephone network; and an indoor cellular antenna for forming a coverage area at a second location. The second location is geographically remote from the first location and the indoor cellular antenna is communicatively coupled to the second base station such that mobile communications equipment located within the coverage area at the second location are communicatively coupled to the telephone network via the indoor cellular antenna and the second base station.

35 Claims, 6 Drawing Sheets

U.S. PATENT DOCUMENTS

| | | |
|---|---|---|
| 4,999,831 A | 3/1991 | Grace |
| 5,193,109 A | 3/1993 | Chien-Yeh Lee |
| 5,212,831 A | 5/1993 | Chuang et al. |
| 5,243,598 A | 9/1993 | Lee |
| 5,303,287 A | 4/1994 | Laborde |
| 5,321,736 A | 6/1994 | Beasley |
| 5,321,849 A | 6/1994 | Lemson |
| 5,339,184 A | 8/1994 | Tang |
| 5,351,146 A | 9/1994 | Chan et al. |
| 5,381,459 A | 1/1995 | Lappington |
| 5,400,391 A | 3/1995 | Emura et al. |
| 5,461,627 A | 10/1995 | Rypinski |
| 5,519,691 A | 5/1996 | Darcie et al. |
| 5,545,397 A | 8/1996 | Spielvogel et al. |
| 5,563,606 A | 10/1996 | Wang |
| 5,566,168 A | 10/1996 | Dent |
| 5,603,080 A | 2/1997 | Kallander et al. |
| 5,621,786 A | 4/1997 | Fischer et al. |
| 5,627,879 A | 5/1997 | Russell et al. |
| 5,631,916 A | 5/1997 | Georges et al. |
| 5,642,405 A | 6/1997 | Fischer et al. |
| 5,644,622 A | 7/1997 | Russell et al. |
| 5,657,374 A | 8/1997 | Russell et al. |
| 5,668,562 A | 9/1997 | Cutrer et al. |
| 5,682,256 A | 10/1997 | Motley et al. |
| 5,701,583 A | 12/1997 | Harbin et al. |
| 5,708,961 A | 1/1998 | Hylton et al. |
| 5,732,076 A | 3/1998 | Ketseoglou et al. |
| 5,761,619 A | 6/1998 | Danne et al. |
| 5,765,097 A | 6/1998 | Dail |
| 5,765,099 A | 6/1998 | Georges et al. |
| 5,774,789 A | 6/1998 | van der Kaay et al. |
| 5,781,541 A | 7/1998 | Schneider |
| 5,781,859 A | 7/1998 | Beasley |
| 5,787,344 A | 7/1998 | Scheinert |
| 5,802,173 A | 9/1998 | Hamilton-Piercy et al. |
| 5,805,983 A | 9/1998 | Naidu et al. |
| 5,809,395 A | 9/1998 | Hamilton-Piercy et al. |
| 5,809,419 A | 9/1998 | Schellinger et al. |
| 5,809,422 A | 9/1998 | Raleigh et al. |
| 5,815,538 A | 9/1998 | Grell et al. |
| 5,822,324 A | 10/1998 | Kostresti et al. |
| 5,833,493 A | 11/1998 | Hung |
| 5,852,651 A | 12/1998 | Fischer et al. |
| 5,875,179 A | 2/1999 | Tikalsky |
| 5,878,325 A | 3/1999 | Dail |
| 5,883,882 A | 3/1999 | Schwartz |
| 5,887,261 A | 3/1999 | Csapo et al. |
| 5,907,544 A | 5/1999 | Rypinski |
| 5,912,641 A | 6/1999 | Dietrich |
| 5,930,682 A | 7/1999 | Schwartz et al. |
| 5,946,622 A | 8/1999 | Bojeryd |
| 5,969,837 A | 10/1999 | Farber et al. |
| 5,983,070 A | 11/1999 | Georges et al. |
| 5,987,014 A | 11/1999 | Magill et al. |
| 6,005,884 A | 12/1999 | Cook et al. |
| 6,014,546 A | 1/2000 | Georges et al. |
| 6,034,950 A | 3/2000 | Sauer et al. |
| 6,078,812 A | 6/2000 | Mintz |
| 6,108,113 A | 8/2000 | Fee |
| 6,108,550 A | 8/2000 | Wiorek et al. |
| 6,108,626 A | 8/2000 | Cellario et al. |
| 6,112,086 A | 8/2000 | Wala |
| 6,125,260 A | 9/2000 | Wiedeman et al. |
| 6,128,496 A | 10/2000 | Scheinert |
| 6,147,786 A | 11/2000 | Pan |
| 6,157,659 A | 12/2000 | Bird |
| 6,157,810 A | 12/2000 | Georges et al. |
| 6,181,687 B1 | 1/2001 | Bisdikian |
| 6,188,693 B1 | 2/2001 | Murakami |
| 6,188,719 B1 | 2/2001 | Collomby |
| 6,192,216 B1 | 2/2001 | Sabat, Jr. et al. |
| 6,195,342 B1 | 2/2001 | Rohani |
| 6,198,558 B1 | 3/2001 | Graves et al. |
| 6,222,660 B1 | 4/2001 | Traa |
| 6,226,274 B1 | 5/2001 | Reese et al. |
| 6,236,365 B1 | 5/2001 | LeBlanc et al. |
| 6,249,252 B1 | 6/2001 | Dupray |
| 6,262,981 B1 | 7/2001 | Schmutz |
| 6,275,990 B1 | 8/2001 | Dapper et al. |
| 6,285,881 B1 | 9/2001 | Huang |
| 6,317,884 B1 | 11/2001 | Eames et al. |
| 6,337,754 B1 | 1/2002 | Imajo |
| 6,353,600 B1 | 3/2002 | Schwartz et al. |
| 6,362,908 B1 | 3/2002 | Kimbrough et al. |
| 6,373,887 B1 | 4/2002 | Aiyagari et al. |
| 6,374,124 B1 | 4/2002 | Slabinski |
| 6,377,640 B2 | 4/2002 | Trans |
| 6,421,009 B2 | 7/2002 | Suprunov |
| RE37,820 E | 8/2002 | Scheinert |
| 6,459,900 B1 | 10/2002 | Scheinert |
| 6,466,572 B1 | 10/2002 | Ethridge et al. |
| 6,480,551 B1 | 11/2002 | Ohishi et al. |
| 6,484,012 B1 | 11/2002 | Nche et al. |
| 6,486,907 B1 | 11/2002 | Farber et al. |
| 6,498,936 B1 | 12/2002 | Raith |
| 6,556,551 B1 | 4/2003 | Schwartz |
| 6,567,473 B1 | 5/2003 | Tzannes |
| 6,574,472 B1 | 6/2003 | Scheinert |
| 6,594,496 B2 | 7/2003 | Schwartz |
| 6,667,973 B1 | 12/2003 | Gorshe et al. |
| 6,674,966 B1 | 1/2004 | Koonen |
| 6,684,058 B1 | 1/2004 | Karacaoglu et al. |
| 6,697,603 B1 | 2/2004 | Lovinggood et al. |
| 6,704,545 B1 | 3/2004 | Wala |
| 6,729,929 B1 | 5/2004 | Sayers et al. |
| 6,768,745 B1 | 7/2004 | Gorshe et al. |
| 6,771,933 B1 | 8/2004 | Eng et al. |
| 6,785,558 B1 | 8/2004 | Stratford et al. |
| 6,801,767 B1 | 10/2004 | Schwartz et al. |
| 6,826,163 B2 | 11/2004 | Mani et al. |
| 6,826,164 B2 | 11/2004 | Mani et al. |
| 6,831,901 B2 | 12/2004 | Millar |
| 6,865,390 B2 | 3/2005 | Goss et al. |
| 6,907,048 B1 | 6/2005 | Treadaway et al. |
| 6,917,614 B1 | 7/2005 | Laubach et al. |
| 6,952,181 B2 | 10/2005 | Karr et al. |
| 6,963,305 B2 | 11/2005 | Knapp |
| 6,967,966 B1 | 11/2005 | Donohue |
| 7,014,500 B2 | 3/2006 | Belesimo |
| 7,016,308 B2 | 3/2006 | Gallagher |
| 7,035,671 B2 | 4/2006 | Solum |
| 7,050,786 B2 | 5/2006 | Caci |
| 7,103,279 B1 | 9/2006 | Koh et al. |
| 7,127,175 B2 | 10/2006 | Mani et al. |
| 7,136,624 B2 | 11/2006 | Ofuji et al. |
| 7,151,940 B2 | 12/2006 | Diao et al. |
| 7,205,864 B2 | 4/2007 | Schultz, Jr. et al. |
| 7,215,651 B2 | 5/2007 | Millar |
| 7,289,972 B2 | 10/2007 | Rieser et al. |
| 7,313,415 B2 | 12/2007 | Wake et al. |
| 2002/0049061 A1 | 4/2002 | Pinola |
| 2002/0072329 A1 | 6/2002 | Bandeira et al. |
| 2002/0089958 A1* | 7/2002 | Feder et al. ............... 370/338 |
| 2002/0128009 A1 | 9/2002 | Boch et al. |
| 2002/0167954 A1 | 11/2002 | Highsmith et al. |
| 2002/0191565 A1 | 12/2002 | Mani et al. |
| 2003/0015943 A1 | 1/2003 | Kim et al. |
| 2003/0040335 A1 | 2/2003 | McIntosh et al. |
| 2003/0043928 A1 | 3/2003 | Ling et al. |
| 2003/0143947 A1 | 7/2003 | Lyu |
| 2003/0162498 A1 | 8/2003 | Rofheart et al. |
| 2003/0216121 A1 | 11/2003 | Yarkosky |
| 2004/0001477 A1 | 1/2004 | D'Amico et al. |

| | | | |
|---|---|---|---|
| 2004/0003804 A1 | 1/2004 | Yasui | |
| 2004/0010609 A1 | 1/2004 | Vilander et al. | |
| 2004/0037565 A1 | 2/2004 | Young et al. | |
| 2004/0102195 A1* | 5/2004 | Naghian et al. | 455/456.1 |
| 2004/0198453 A1 | 10/2004 | Cutrer et al. | |
| 2004/0204097 A1* | 10/2004 | Scheinert et al. | 455/561 |
| 2004/0219950 A1 | 11/2004 | Pallonen et al. | |
| 2004/0233877 A1 | 11/2004 | Lee et al. | |
| 2004/0248580 A1 | 12/2004 | Backes et al. | |
| 2004/0258100 A1 | 12/2004 | Jantti et al. | |
| 2005/0007993 A1 | 1/2005 | Chambers et al. | |
| 2005/0143091 A1 | 6/2005 | Shapira et al. | |
| 2005/0147067 A1 | 7/2005 | Mani et al. | |
| 2005/0148368 A1 | 7/2005 | Scheinert et al. | |
| 2005/0153712 A1 | 7/2005 | Osaka et al. | |
| 2005/0157675 A1 | 7/2005 | Feder et al. | |
| 2005/0201323 A1 | 9/2005 | Mani et al. | |
| 2005/0221817 A1* | 10/2005 | Pinola | 455/423 |
| 2005/0233710 A1 | 10/2005 | Lakkis et al. | |
| 2005/0243785 A1 | 11/2005 | Sabat, Jr. et al. | |
| 2005/0250503 A1 | 11/2005 | Cutrer | |
| 2006/0041680 A1 | 2/2006 | Proctor, Jr. et al. | |
| 2006/0072602 A1 | 4/2006 | Achanta | |
| 2006/0121944 A1 | 6/2006 | Buscaglia et al. | |
| 2006/0123053 A1 | 6/2006 | Scannell, Jr. | |
| 2006/0133346 A1 | 6/2006 | Chheda et al. | |
| 2006/0172710 A1 | 8/2006 | Cahana et al. | |
| 2006/0193295 A1 | 8/2006 | White et al. | |
| 2006/0234722 A1 | 10/2006 | Hanebeck et al. | |
| 2007/0099562 A1 | 5/2007 | Karabinis et al. | |
| 2008/0014948 A1 | 1/2008 | Scheinert | |
| 2009/0061766 A1 | 3/2009 | Ding et al. | |

FOREIGN PATENT DOCUMENTS

| | | |
|---|---|---|
| EP | 0391597 | 10/1990 |
| EP | 0664621 | 7/1995 |
| EP | 0876073 | 11/1998 |
| GB | 2253770 | 9/1992 |
| GB | 2289198 | 11/1995 |
| GB | 2315959 | 2/1998 |
| GB | 2320653 | 6/1998 |
| WO | 9115927 | 10/1991 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9937035 | 7/1999 |
| WO | 0174013 | 10/2001 |
| WO | 0174100 | 10/2001 |
| WO | 2004034508 | 4/2004 |

OTHER PUBLICATIONS

Harvey et al., "Cordless Communications Utilising Radio Over Fibre Techniques for the Local Loop", "IEEE International Conference on Communications", Jun. 1991 , pp. 1171-1175, Publisher: IEEE.

"EDGE Introduction of High-Speed Data in GSM/GPSR Networks", 2003, pp. 116, Publisher: Ericsson AB.

"Mulitple-Input Multiple-Output Communications", "http://en.wikipedia.org/wiki/Multiple-input_multiple-ouput_communications", May 17, 2007, Publisher: Wikipedia, Published in: US.

"Products: nanGSM Picocell", "http://www.ipaccess.com/nanGSM/nanGSM.htm", Aug. 2, 2007, pp. 1-8, Publisher: ip.access.

Hewlett-Packard Development Co., L.P., "Voice Over Wireless LAN Solution Brief", "ProCurve Networking by H.P.", 2006, Publisher: Hewlett-Packard Development Co., L.P.

Wala, "A New Microcell Architecture Using Digital Optical Transport", "Proceedings of the Vehicular Technology Conference", May 18, 1993, pp. 585-588, Publisher: IEEE, Published in: US.

Akos et al., "Direct Bandpass Sampling of Multiple Distinct RF Signals", Jul. 1, 1999, pp. 983-988, vol. 47, Publisher: IEEE Transactions on Communications.

Foxcom Wireless Proprietary Information, "Litenna In-Building RF Distribution System", 1998, pp. 1-8.

1998 Foxcom Wireless Proprietary Information, "Application Note "RFiber- RF Fiberoptic Links for Wireless Applications"", 1998, pp. 3-11, Published in: US.

Nakatsugawa et al., "Software Radio Base and Personal Stations for Cellular/PCS Systems", 2000, pp. 617-621, Publisher: IEEE.

"Tektronix Synchronous Optical Network (SONET)", "http://www.iec.org/online/tutorials/sonet/topic03.html", 2002, Publisher: International Engineering Consortium.

Georges et al., "U.S. Appl. No. 08/635,368", "Distribution of Radio-Frequency Signals Through Low Bandwidth Infrastructures", Filed Apr. 19, 1996, Publisher: Abandoned, Published in: US.

Schwartz, "U.S. Appl. No. 09/560,656", "Adaptive Capacity Management in a Centralized Basestation Architecture", Filed on Apr. 27, 2000, Publisher: Abandoned, Published in: US.

Wong et al., "U.S. Appl. No. 09/561,372", "A Cellular Communications System With Centralized Capacity Resources Using DWDM Fiber Optic Backbone", Filed on Apr. 28, 2000, Publisher: Abandoned, Published in: US.

B. Schweber, Maintaining cellular connectivity Indoors demands sophisticated design, EDN Magazine, Dec. 21, 2000.

* cited by examiner

US 7,844,273 B2

SYSTEM FOR AND METHOD OF FOR PROVIDING DEDICATED CAPACITY IN A CELLULAR NETWORK

FIELD OF THE INVENTION

The present invention relates to wireless cellular networks and, more particularly, to providing dedicated capacity in wireless cellular networks.

BACKGROUND OF THE INVENTION

In conventional wireless cellular networks, the initial roll-out typically involves installation of macro stations to provide wireless cellular coverage for mobile units. A macro base station comprises multiple transceiver units, outputs relatively high power (i.e. 10 watts or more) to its antenna(s) and is communicatively coupled to a telephone network via a backhaul connection. The backhaul connection includes a T1 connection (in the United States) or an E1 connection (in Europe) to a base station controller which is, in turn, connected to the telephone network. Because macro base stations output high power, they can provide large areas of coverage.

The capacity of a macro base station can be expanded to a limited degree by the addition of transceivers and antennas to the macro base station. Additional macro base stations can also be added to the cellular network. However, these measures have limitations due to interference among macro base stations due to their large coverage areas and high output power.

A solution to this capacity problem has been to add micro or pico base stations to the cellular network. Similarly to a macro base station, a micro base station comprises multiple transceiver units and is communicatively coupled to a telephone network via a backhaul connection. However, compared to the output power of a macro base station, a micro base station outputs relatively low power (i.e. 1-2 watts) to its antenna(s). A pico base station is also communicatively coupled to a telephone network via a backhaul connection, but comprises only a single transceiver unit and typically uses an Internet protocol (IP) backhaul connection in which voice signals are converted to IP packets. A pico base station outputs relatively low power (i.e. less than one watt) to its antenna. Pico base stations can be located indoors, such as in offices, shopping centers, convention centers, and airports.

A drawback to this approach for adding capacity to the network is that the micro or pico base stations are located at sites where the additional capacity is needed and therefore require additional infrastructure for each site. Furthermore, they are not easily accessible for maintenance or upgrades. Also, because an additional backhaul link is required for each micro or pico base station, the backhaul links tend to increase installation and maintenance expense.

SUMMARY OF THE INVENTION

The present invention comprises systems for and methods of providing dedicated capacity in a wireless cellular network. In an embodiment, a system for providing dedicated capacity in a cellular network comprises: a first base station positioned at a first location and being communicatively coupled to a telephone network, the first base station having an outdoor cellular antenna for forming a local coverage area, a second base station positioned at the first location and being communicatively coupled to the telephone network; and an indoor cellular antenna for forming a coverage area at a second location. The second location is geographically remote from the first location and the indoor cellular antenna is communicatively coupled to the second base station such that mobile communications equipment located within the coverage area at the second location are communicatively coupled to the telephone network via the indoor cellular antenna and the second base station.

DETAILED DESCRIPTION OF THE INVENTION

Figure 1:
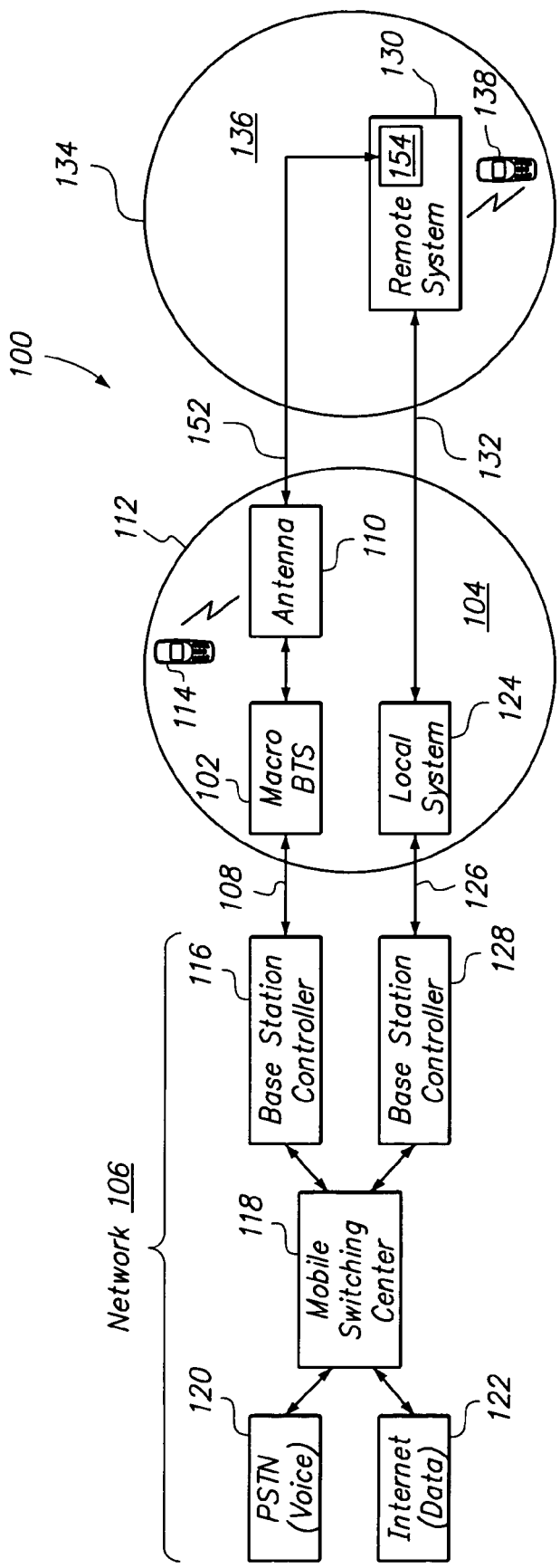
FIG. 1 illustrates a system for providing dedicated capacity in a wireless cellular network in accordance with an embodiment of the present invention.

FIG. 1 illustrates a system 100 for providing dedicated capacity in a wireless cellular network in accordance with an embodiment of the present invention. As shown in FIG. 1, a base station 102 is positioned at a first location 104, which may also be referred to as the "local" site. The base station 102 is communicatively coupled to a communications network 106 via a backhaul link 108. The base station 102 is coupled to an antenna 110 at the first location to form a local coverage area 112. The antenna 110 may be an outdoor antenna. Mobile communications equipment 114 (e.g., a cell phone) within the coverage area 112 are communicatively coupled to the communications network 106 via the antenna 110, base station 102 and backhaul 108.

Within the communications network 106, the backhaul 108 is coupled to a base station controller 116, which is, in turn, coupled to a mobile switching center (MSC) 118. The MSC 118 is coupled to a public switched telephone network (PSTN) 120 (e.g. for voice communications) and may also be coupled the Internet 122 (e.g. for data communications).

The base station 102 may be a macro base station. In this case, the macro base station comprises multiple transceiver units, outputs high power (i.e. 10 watts or more) and is communicatively coupled to the communications network 106 via the backhaul 108 which includes one or more T1 connections (in the United States) or E1 connections (in Europe). One or more additional macro base stations may be connected to the base station controller 116.

Alternatively, the base station 102 may be pico base station or a micro base station. However, the macro base station is generally preferred for the base station 102 since it provides a larger coverage area 112.

As is also shown in FIG. 1, a local system 124 is co-located with the base station 102 at the first location 104 and is communicatively coupled to the communications network 106 via a backhaul link 126. Within the communications network 106, the backhaul 126 is coupled to a base station controller 128, which is, in turn, coupled to the MSC 118. Multiple local systems may be coupled to the base station controller 128.

The local system 124 is coupled to a remote system 130 via a communications link 132. The remote system 130 forms a coverage area 134 at a second location 136 such that mobile communications equipment 138 (e.g., a cell phone) located within the coverage area 134 are communicatively coupled to the communications network 106 via the remote system 130, the link 132 and the local system 124. The second location 136 is also referred to as a "remote" site. The coverage area 134 is generally indoors. The second location 136 is geographically remote from the first location 104. By geographically remote, what is meant is that the first and second locations 104 and 136 are separated by a distance of approximately 100 meters or more. In embodiments, this distance can be greater than 1 kilometer, or greater than 10 kilometers.

Co-locating the local system 124 with an existing, conventional macro base station (e.g., the base station 102) allows the local system 124 to take advantage of existing site infrastructure of the macro base station, such as an equipment enclosure and an antenna mounting structure as well as site permitting with governmental authorities. Thus, the local system 124 and base station 102 may share the site infrastructure. While a single local system 124 is shown co-located with the base station 102, one or more additional local systems may be provided, each communicatively coupled to a remote system.

The arrangement of FIG. 1 allows mobile communications equipment 138 to employ dedicated capacity of the local system 124, while the mobile communications equipment 138 and coverage area 134 are remotely located from the local system 124.

Figure 2:
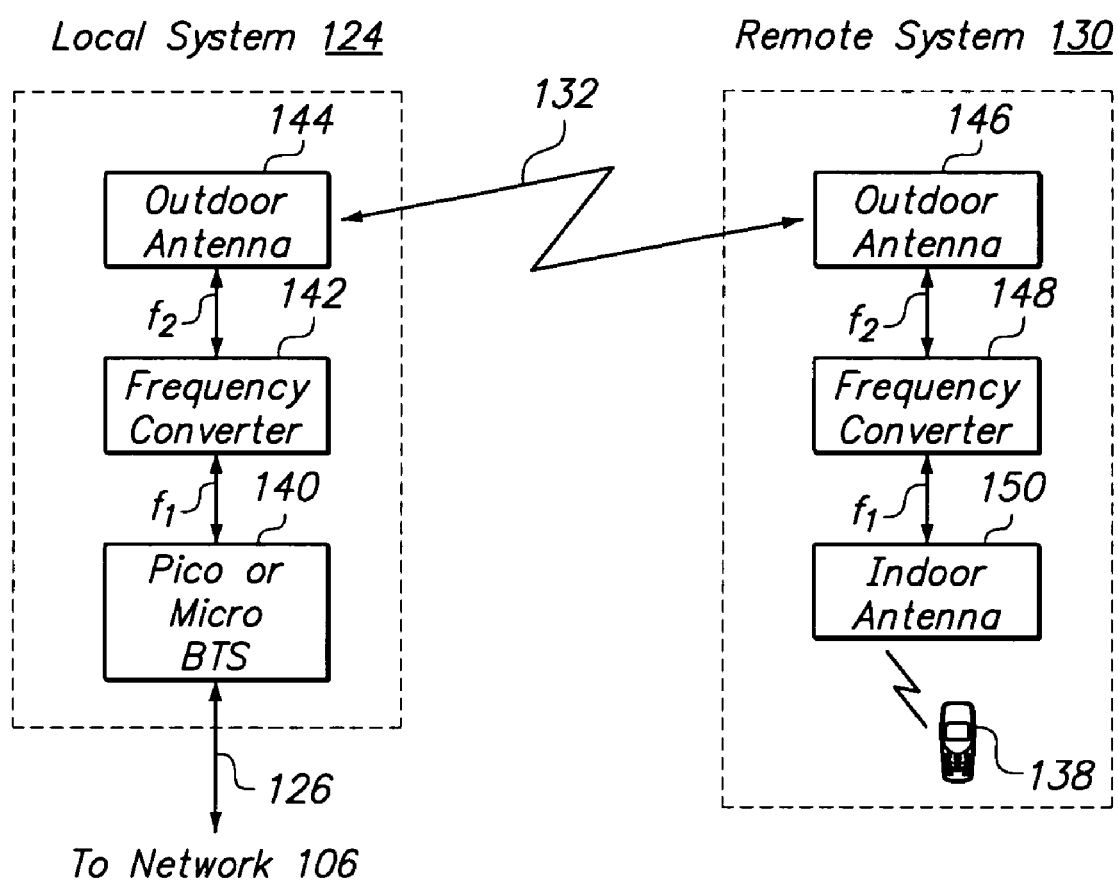
FIG. 2 illustrates additional details of the system of FIG. 1 in accordance with an embodiment of the present invention.

FIG. 2 illustrates additional details of system 100 of FIG. 1 in accordance with an embodiment of the present invention. As shown in FIG. 2, the local system 124 includes a base station 140, a frequency converter 142 and an antenna 144, which is typically an outdoor antenna. The base station 140 is coupled to the frequency converter 142, which is, in turn, coupled to the antenna 144.

The base station 140 may be a conventional base station, such as a macro base station, a micro base station or a pico base station. The pico base station outputs low power (i.e. less than one watt), comprises only a single transceiver unit and uses an Internet protocol (IP) backhaul connection in which voice signals are converted to IP packets for the communication via the backhaul 126. Alternatively, the pico base station may use a T1 or E1 connection for the backhaul 126. The micro base station comprises multiple transceiver units and also outputs low power (i.e. 1-2 watts). The micro base station may use a T1 connection or an E1 connection for the backhaul 126. Alternatively, the base station 140 may be a macro base station in which a sector of the macro base station is communicatively connected to the antenna 144. The macro base station comprises multiple transceiver units, outputs relatively high power (i.e. 10 watts or more) to its antenna(s) uses a T1 connection or an E1 connection for the backhaul 126. The pico base station is preferred since it tends to have a lower cost than that of the macro base station or micro base station; though a micro base station will also tend to have a lower cost than a macro base station. In a preferred embodiment, the base station 140 is a commercially available, off-the-shelf pico base station.

The frequency converter 142 converts a signal received from the base station 140 in a first frequency, $f_1$, to a second frequency, $f_2$, used by the antenna 144. The frequencies $f_1$ and $f_2$ can either be in the same band (i.e. a few megahertz apart) or in different bands. The frequency translation may be performed, for example, by down-converting a radio frequency signal at $f_1$ to an intermediate frequency (e.g., 70 MHz) and then by up-converting the intermediate frequency signal to a radio frequency signal at $f_2$. Alternatively, the radio frequency signal at $f_1$ may be sampled to form a digital signal and then the digital signal may be converted to a radio frequency signal at $f_2$.

In an embodiment, the base station 140 sends and receives signals using frequency ranges designated for Global System for Mobile Communications (GSM). For example, the base station 140 sends and receives signals using the 850 MHz frequency band (i.e. 824-849 MHz uplink and 869-894 MHz downlink) or the 1900 MHz frequency band (i.e. 1850-1910 MHz uplink and 1930-1990 MHz downlink). Also, in an embodiment, the antenna 144 sends and receives signals using frequency ranges designated for Multi-channel, Multi-point Distribution System (MMDS). These frequencies are licensed by the Federal Communications Commission (FCC). For example, the antenna 144 sends and receives signals in the 2500 MHz frequency band (i.e. 2496-2644 MHz). Therefore, the frequency converter 142 may convert signals between these frequency ranges used by the base station 140 and the antenna 144.

As shown in FIG. 2, the remote system 130 includes an antenna 146, which may also be an outdoor antenna, a frequency converter 148 and an antenna 150, which may be an indoor antenna. The antenna 146 is coupled to a frequency converter 148, which is, in turn, coupled to the indoor antenna 150. As mentioned, mobile communications equipment 138 are communicatively coupled to the antenna 150. The local system 124 and the remote system 130 are communicatively coupled by wireless communication link 132 between the antenna 144 of the local system 124 and the antenna 146 of the remote system 130.

The frequency converter 148 of the remote system 130 may convert signals received from the antenna 146 in the second frequency, $f_2$, to the first frequency, $f_1$. The frequency translation may be performed, for example, by down-converting a radio frequency signal at $f_2$ to an intermediate frequency (e.g., 70 MHz) and then by up-converting the intermediate frequency signal to a radio frequency signal at $f_1$. The down-converted signals may be in digital or analog form. For example, the frequency converter 148 may convert signals received from the antenna 146 in the 2500 MHz frequency band to the 850 MHz frequency band or the 1900 MHz frequency band. Alternatively, the frequency converter 148 may convert the signals received from the antenna 146 into some other frequency suitable for communication with the mobile communications equipment 138. The mobile communications equipment 138 will recognize the signal received from the antenna 150 in the same way as it would if the signal was received directly from a conventional base station.

The down-converted signals communicated between the antennas 146 and 150 within the remote system 130 may be at an intermediate frequency (e.g., 70 MHz) or, in the case of digital signals, at baseband and may be communicated via a lengthy cable. For example, a metallic cable, such as copper RJ-11 or RJ-45 cable, could allow the antenna 146 to be separated from the antenna 150 by up to a few hundred meters. As another example, a coaxial cable could allow the separation to be as much as one kilometer or more. As yet another example, fiber optical cable could be used which could allow an even greater separation.

As described above, the 2500 MHz frequency band may be used for the link 132. In other embodiments, the antennas 144 and 146 may communicate with each other using the same band as is used by the base station 102 (e.g. 850 or 1900 MHz band), but using different channels from those used by the base station 140 (e.g. 1940 MHz channel for base station 102 and 140 and 1945 MHz channel for the link 132) or by using a different GSM band than that of the base station 140. For example, if the base station 140 communicates using the 850 MHz band, the link 132 may use the 1900 MHz band and vice-versa. The link 132 may use out-of-band frequencies, such as other licensed frequencies not currently used for mobile communications, such as the 2500 MHz band (described above), 23 GHz band, or 400 MHz band. Unlicensed frequency bands may also be used by the link 132, such as 60 GHz or E-band in 75 GHz-92 GHz. Some frequencies may require a point-to-point link between the local and remote locations.

As described above, signals are communicated from the network 106, the local system 124 and the remote system 130 to the mobile communications equipment 138. It will be understood that operations performed by the elements of drawings shown herein are duplex (i.e. two-way) operations. Accordingly, signals are also communicated from the mobile communications equipment 138 to the remote system 130, to the local system 124 and to the network 106 in essentially the same manner but in the opposite direction.

In order to drive the antenna 144 for outgoing communications, antenna driver circuitry (not shown), which may include a duplexer, is provided at the local system 124. Similarly, antenna driver circuitry (not shown) is provided at the remote system 130 to drive the antenna 146 for outgoing communications. Antenna driver circuitry is also provided at the remote system 130 to drive the antenna 150.

The frequency conversion performed at the local system 124 and the remote system 130 may be performed on a per-channel basis (e.g. 1 CDMA channel) by separately converting each channel or on a frequency band basis (e.g. a 5 MHz wide band of frequencies) by converting a band of frequencies together to accommodate multiple channels (e.g. 1 CDMA channel for voice and 2 EV-DO channels for data).

In order to acquire the desired incoming signal at the remote system 130, a selective receiver (e.g., a channel selective receiver or a band selective receiver) (not shown) is provided between the antenna 146 and the frequency converter 148 for incoming signals. Similarly, to acquire the desired incoming signal at the local system 124, a selective receiver (not shown) is provided between the antenna 144 and the frequency converter 142 for incoming signals.

The antennas 144 and 146 may be directional or omni-directional. By providing that the antenna 150 is located indoors and the antenna 146 is located outdoors, this provides significant isolation between the antennas 146 and 150. Alternatively, the antenna 146 may also be located indoors if the signal is sufficiently strong to overcome attenuation caused by exterior building walls and signal isolation between the antennas 146 and 150 is sufficient.

In an embodiment, an auxiliary communication link 152 (FIG. 1) is provided between the remote system 130 and the local system 124. This auxiliary communication link is in addition to the link 132. For example, an auxiliary communication device 154 (FIG. 1), such as a data modem, may be provided at the remote system 130. In this case, the auxiliary communication device may be in communication with the base station 102 (FIG. 1) via the link 152 using the frequency band used by base station 102 (e.g. the 1900 MHz band). In addition, the auxiliary communication device 154 is coupled to the elements within the remote system 130. The link 152 may be used for communicating administrative information. For example, the auxiliary communication device 154 may report operational information about the equipment at the remote system 130, such as alarms, even if the link 132 to the local system 124 is not functional. As another example, the communication device 154 may receive parameter settings which are used to configure the remote system 130 from a network management system via the auxiliary communication link 152. Exemplary parameter settings include the output power at the antenna 150 and antenna 146 or selection of communication frequencies (e.g., $f_1$ and $f_2$).

Figure 3:
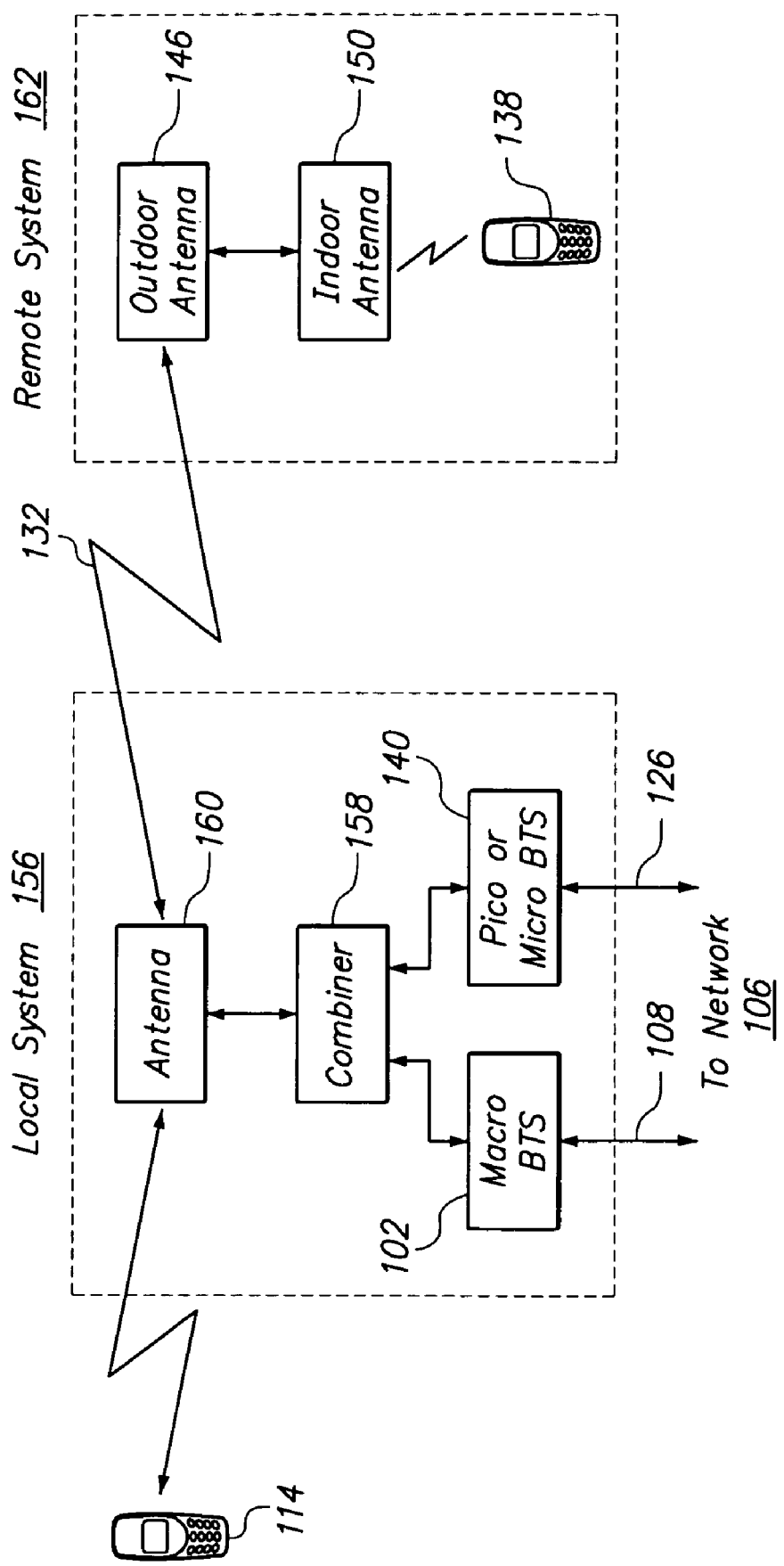
FIG. 3 illustrates an alternative embodiment of a system of providing dedicated capacity using a combined antenna at a local site in accordance with an embodiment of the present invention.

As described above, the base station 102 and the local system 124 each employs is own corresponding antenna. Particularly, the base station 102 employs antenna 110, while the local system 124 employs antenna 144. This tends to provide greater isolation between communications to and from the base station 102 and communications to and from the local system 124. Alternatively, functionality of the antennas 110 and 144 may be performed by single antenna, in which case, the base station 102 and the base station 140 share a common antenna. FIG. 3 illustrates a system of providing dedicated capacity in which a common antenna is shared in accordance with an embodiment of the present invention. As shown in FIG. 3, a local system 156 includes the base station 102, the base station 140, a combiner 158 and an antenna 160. The combiner 158 combines output signals from both base stations 102 and 140, and uses a combined signal to drive the antenna 160. The local system 156 of FIG. 3 may replace the local system 124 as well as the base station 102 and antenna 110 of FIG. 1. The local system 156 communicates with a remote system 162 via the antenna 160 and link 132. The local system 156 also communicates with mobile communications equipment 114 within the local coverage area 112 via the antenna 160.

The remote system 162 of FIG. 3 differs from the remote system 130 of FIG. 2 in that the frequency converter 148 of FIG. 2 omitted. This is possible because, in an exemplary embodiment, the same frequency band is used for the link 132 as is used by the antenna 150 to communicate with mobile equipment 138. It will be understood that the remote system 162 may include additional signal processing elements. For example, between the antennas 146 and 150 duplexers may be provided to separate incoming and outgoing signals for each antenna, and for the signals passing between the antennas 146 and 150, an amplifier may be provided to increase signal strength before the signal is reradiated. For example, communications over the link 132 and communications between the antenna 150 and mobile equipment 138 may be at the same frequency channel (e.g. 1940 MHz channel), whereas the macro base station 102 may be operating in the same band on a different frequency channel (e.g. 1930 MHz channel). In this case, the frequency converters 142 and 148 can be omitted and functionality of the antennas 110 and 144 may be performed by the single antenna 160. Transceiver units of the base stations 102 and 140 may perform channel selection so that each processes communications received in the corresponding channel. So that the mobile communications equipment 114 does not camp on the signal on link 132 intended for the remote system 162, the strength of this signal received by the mobile communications equipment 114 from the link 132 should be lower than that of the signal strength in the channel intended for the mobile communications equipment 114.

Figure 4:
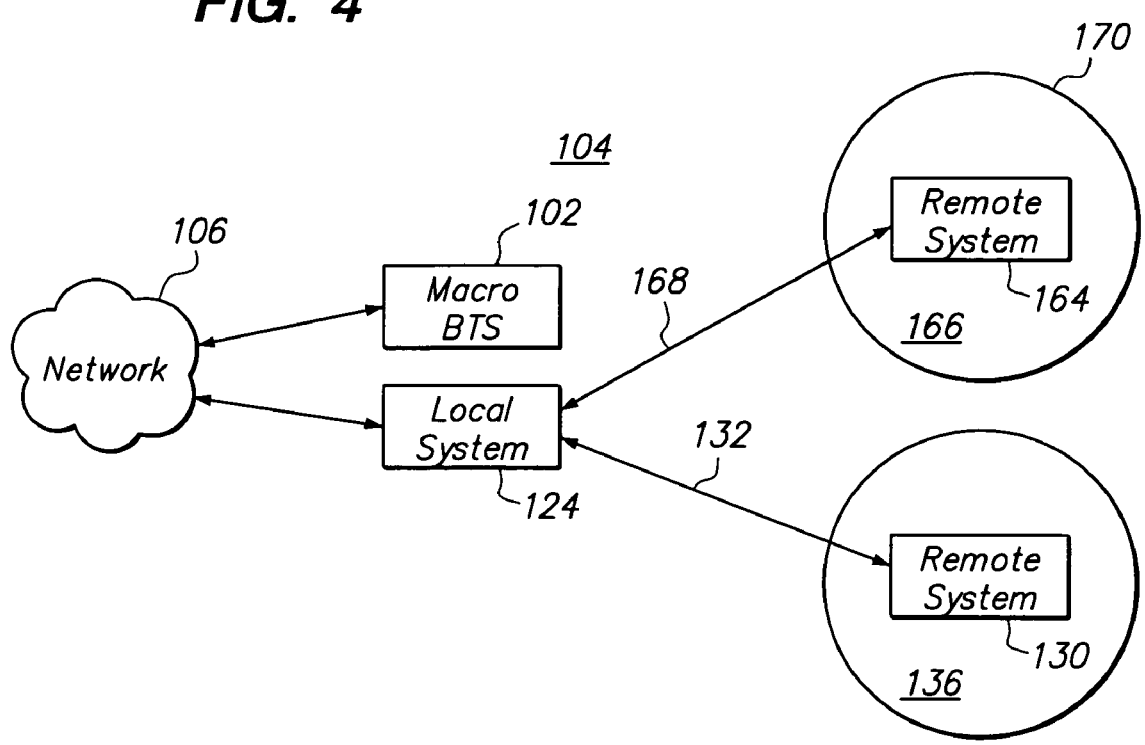
FIG. 4 illustrates an alternative embodiment of a system for providing dedicated capacity at multiple remote sites in accordance with an embodiment of the present invention.

FIG. 4 illustrates a system for providing dedicated capacity in which multiple remote systems communicate with a single local system in accordance with an embodiment of the present invention. As shown in FIG. 4, the local system 124 is positioned at the local site 104 and is communicatively coupled to the remote system 130 at the remote site 136, as in FIG. 1. In addition, the local system 124 is communicatively coupled to a second remote system 164 at a remote site 166 via a communication link 168. The second remote system 164 may include the same functional elements as described above for the remote system 130. The second remote system 164 forms a second coverage area 170 such that mobile communications equipment located within the coverage area 170 are communicatively coupled to the communications network 106 via the remote system 164, the link 168 and the local system 124. The coverage area 170 may also be indoors. In addition, the remote site 166 is geographically remote from the local site 104. Accordingly, the site 166 and the site 136 may comprise separate buildings, both of which are remotely located from the local system 124. Therefore, the separate buildings at the sites 136 and 166 share the capacity of the base station 140 of the local system 124. For example, signals sent from the local system 124 to the site 136 may also be received at the site 166 and retransmitted by the remote system 164. Accordingly, the same antenna 144 (FIG. 2) may be used to communicate with both remote systems 130 and 164 While FIG. 4 shows that two sites 136 and 166 share this capacity, a greater number of sites may be configured in this manner to share the capacity of a base station (e.g., the base station 140 of the local system 124). The local system 124 and base station 102 of FIG. 4 may be replaced with the local system 156 of FIG. 3, which uses the shared antenna 160 for local and remote coverage.

Figure 5:
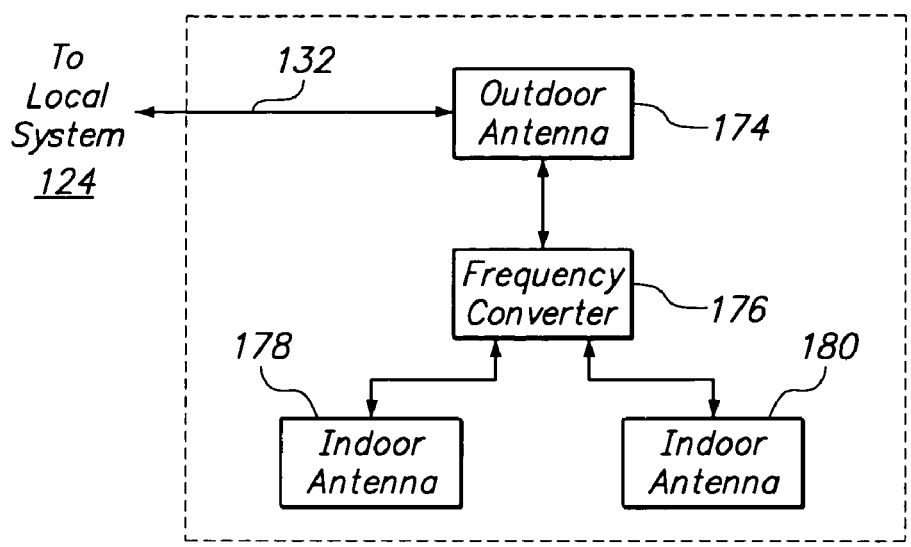
FIG. 5 illustrates an alternative embodiment of a remote system having multiple antennas in accordance with an embodiment of the present invention.

FIG. 5 illustrates an alternative embodiment of a remote system in accordance with an embodiment of the present invention. The remote system 172 includes an antenna 174, a frequency converter 176 coupled to the antenna 174 and two antennas 178 and 180 coupled to the frequency converter 176. The antenna 174 may be an outdoor antenna while the antennas 178 and 180 may be indoor antennas. Antennas 178 and 180 may be coupled to antenna driver circuitry (not shown) at the remote system 172 via a multiplexer. Alternatively, antenna driver circuitry at the remote system 172 may drive both of the antennas 178 and 180. The remote system 172 is communicatively coupled to a local system (e.g., local system 124) via the communication link 132. The remote system 172 functions in the same manner as remote system 130, as described above, except that it includes two or more antennas at the remote site that share the capacity of the local system. For example, the two antennas 178 and 180 may both be located within the same building. Systems of multiple indoor antennas are known as Distributed Antenna System (DAS) and are described in more detail in U.S. Pat. Nos. 5,765,099, 5,983,070, 6,014,546 and 6,147,810, the entire contents of which are hereby incorporated by reference.

By providing multiple antennas at the remote site, a greater coverage area is provided in comparison to the coverage area of a single antenna. Such an arrangement is suitable when the remote location at which the remote system 172 is used comprises the interior of a large building, such as a convention center, airport or larger enterprise site. While FIG. 5 shows that two antennas 178 and 180 at a single site share the capacity of a base station (e.g., base station 140), a greater number of antennas at a single location may be configured in this manner to share the capacity of a base station. Moreover, this arrangement in which multiple antennas at a single site share the capacity of a single base station may used in combination with the arrangement described above in connection with FIG. 4 in which antennas at multiple sites share the capacity of a single base station.

Referring to FIG. 1, in an embodiment, the coverage area 112 of the base station 102 may overlap the coverage area 134 of the remote system 130. For example, the remote site 136 may be within the coverage area of the antenna 110. As mentioned above, the base station 102 and the remote system 130 may use the same frequency band, but different channels. In this case, a hard-handoff between the base station and the remote system 130 may be enabled (e.g., for CDMA and UMTS networks). Alternatively, the base station 102 and the remote system 130 may use the same frequency band and channel. In this case, soft-handoff between the base station 102 and the remote system 130 may be enabled (e.g., for CDMA and UMTS networks). When a user of mobile communications equipment within the coverage area of the base station 102 is outside of a building that comprises the remote location 136, cellular communications may occur via the base station 102. However, when the user enters the building, signal strength from the base station 102 (e.g., via antenna 110) can be expected to fall, while signal strength from the remote system 130 (e.g. via antenna 150) can be expected to increase. Handoff can occur when the received signal strength from the remote system 130 exceeds the received signal strength from the base station 102. A handoff back to the base station 102 can occur when the user exits the building and the received signal strength from the base station 102 exceeds the received signal strength from the remote system 130.

In an embodiment, one or more transceivers of the macro base station 102 may be employed to provide the coverage area 112 at the local site 104, while one or more other transceivers may be employed to provide the link 132 to the remote system 130. In this case, the base station 140 can be omitted since its functionality is performed by base station 102 by using one or more sectors of the base station 102 for the functions of base station 140. For example, the base station 102 is a macro base station, which may have n+m sectors, where n is the number of sectors used for the local coverage area 112 (e.g. n=3, where each sector is 120 degrees) and m is the number of sectors to remote coverage areas, such as the link 132 to the remote coverage area 134. The m sectors of the base station 140 may be configured similar to the n sectors (e.g. in three 120 degree sectors) such that remote sites within each sector are linked to the base station 140 by the antenna of the corresponding sector, or as overlays (i.e. multiple 360 degree sectors) such that different remote sites can be linked using any of the 360 degree sectors, depending on communication traffic conditions. The base station 102 will be configured so that one or more of its transceiver units are dedicated to each of the n+m sectors. Accordingly, the m sectors which are used for remote coverage can be implemented by sectors of the base station 102 or by using one or more separate macro, micro or pico base station(s), such as the base station 140, as explained above in connection with in FIGS. 1-2.

Figure 6:
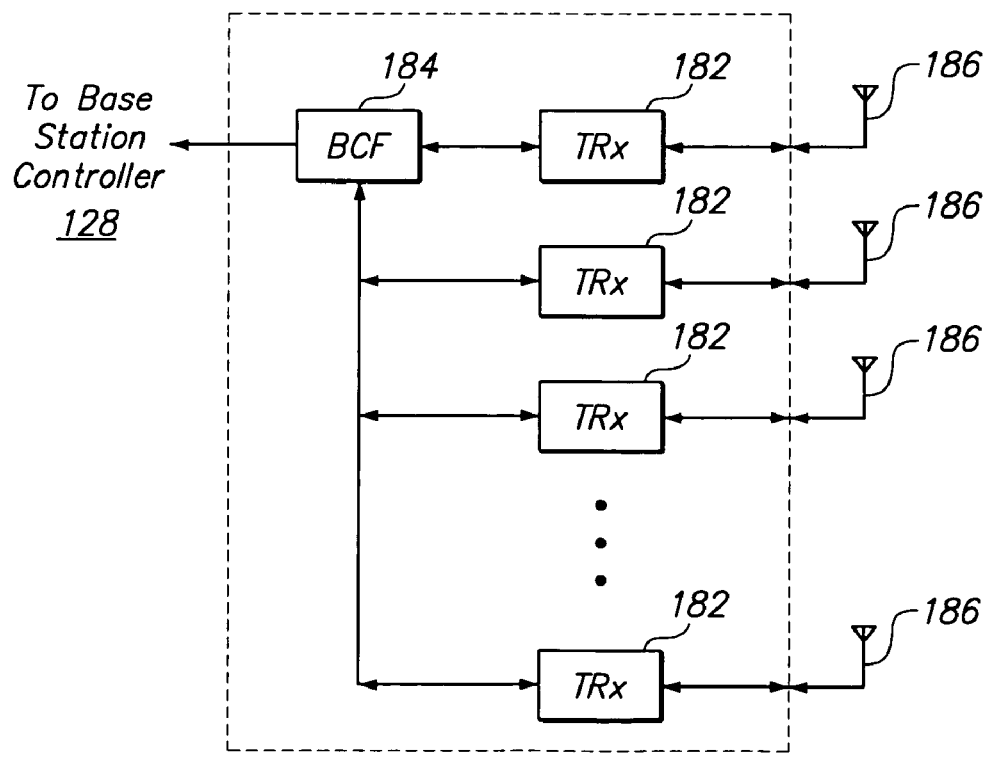
FIG. 6 illustrates an alternative embodiment of a base station for the local system in accordance with an embodiment of the present invention.
Figure 7A:
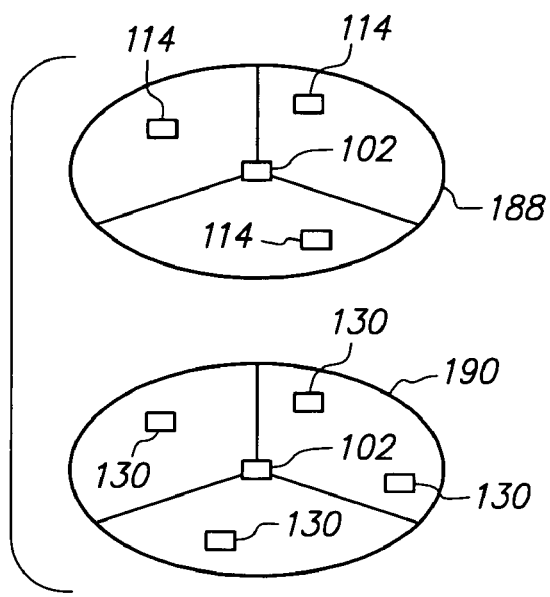
FIGS. 7A-C illustrate the use of sectors for providing dedicated capacity in a wireless cellular network in accordance with an embodiment of the present invention.
Figure 7B:
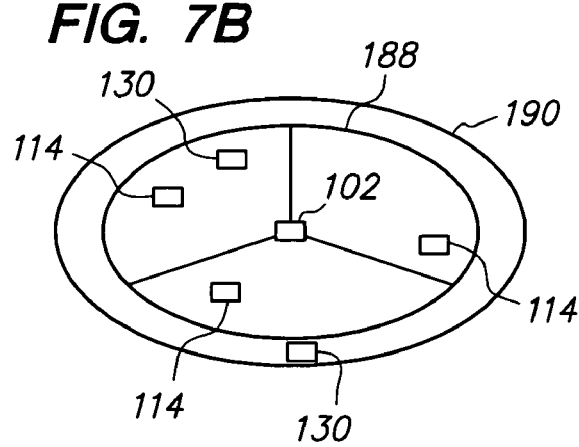
Figure 7C:
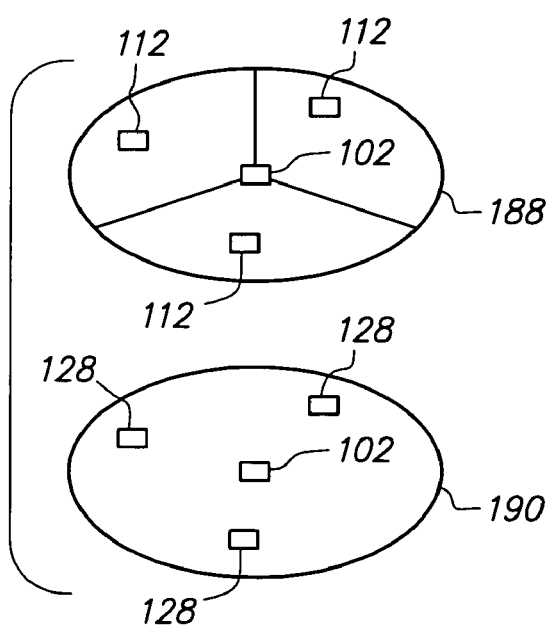

FIG. 6 illustrates the base station 102 implemented as a macro base station having a plurality of transceiver units 182 coupled to a base station control function 184. Each transceiver is shown having a corresponding antenna 186, though it will be apparent that more than one transceiver can be coupled to a single antenna. Each antenna 186 forms a corresponding sector. In the case of an omni-directional antenna, the corresponding sector is 360 degrees; in the case of a directional antenna, the corresponding sector is less than 360 degrees. The base station control function 184 controls operations of the base station 102 and is coupled to the base station controller 128. The base station 102 may use the first n sectors for communicating directly with mobile communication equipment within a coverage area 188 (shown in FIGS. 7A-C)

and the remaining m sectors for communicating with remote systems within a coverage area 190 (also shown in FIGS. 7A-C).

FIGS. 7A-C illustrate the use of sectors for providing dedicated capacity in a wireless cellular network in accordance with an embodiment of the present invention. As shown in FIGS. 7A-C, the macro base station 102 forms two coverage areas 188 and 190 in which the coverage area 188 is for communicating directly with mobile communication equipment 114 and the coverage area 190 is communicating with remote systems (e.g. remote system 130). As shown in FIG. 7A, the coverage area 188 may include three sectors for communicating directly with mobile communication equipment 114 within the coverage area 188. In this example, n=3 since there are three sectors providing local coverage. The n sectors may each be provided by a corresponding one of the transceivers 182 of FIG. 6 and a corresponding 120-degree directional antenna 186. In addition, the coverage area 190 may include three sectors for communicating with remote systems (e.g., the remote system 130 of FIG. 1) with the coverage area 190. In this case, m=3 because there are three sectors providing coverage for remote sites. The m sectors may each be provided by a corresponding one or more of the transceivers 182 of FIG. 6 and a corresponding 120-degree directional antenna 186. The coverage areas 188 and 190 are centered about the base station 102 and, thus, they overlap, as shown in FIG. 7B. The coverage area 190 may be larger than the coverage area 188 such that a remote site can be outside the local coverage area 188, but within the coverage area 190. This is because the distance to the remote site can be greater by using a directional antenna (e.g. antenna 146) at the remote site, installing the antenna at the remote sites at higher elevation than ground level and/or by installing the antenna at the remote site outdoors. These are reasons why even by using a lower output power at the antenna used for a remote coverage sector compared to the power at an antenna used for local coverage, the signal can be communicated at further distances.

In an alternative embodiment, rather than providing a separate antenna for local and remote coverage for each sector, as described above, a single antenna can provide both local and remote coverage in the same sector. In this case, a combiner may combine the output of two or more transceivers 182 so that they both drive a single one of the antennas 186 for both local and remote coverage.

In addition, rather than providing three sectors for coverage to remote systems 130, as in FIGS. 7A-B, a single omni-directional antenna may provide the coverage area 190. In this case, m=1 since there is only one sector for remote coverage. However, local coverage may still be provided by multiple sectors. FIG. 7C illustrates the case where m=1 and n=3. Similarly to FIGS. 7A-B, the coverage areas 188 and 190 of FIG. 7C overlap. Alternatively, multiple omni-directional antennas may provide the remote coverage area 190 in which the coverage areas of the omni-directional antennas overlap each other. It will be apparent that the configurations of FIGS. 7A-C are exemplary and that other values can be selected for m and n.

Accordingly, systems for and methods of providing dedicated capacity in a wireless cellular network have been described. These systems and methods can be used for all standard mobile technologies, such as GSM, Code Division Multiple Access (CDMA), Universal Mobile Telecommunications System (UMTS) and wireless networks based on the IEEE 802.16 standard (WiMax).

The foregoing detailed description of the present invention is provided for the purposes of illustration and is not intended to be exhaustive or to limit the invention to the embodiments disclosed. Accordingly, the scope of the present invention is defined by the appended claims.

The invention claimed is:

1. A system for providing dedicated capacity in a cellular network, comprising:
   a first base station positioned at a first location and being communicatively coupled to a telephone network, the first base station having an outdoor cellular antenna for forming a local coverage area;
   a second base station positioned at the first location and being communicatively coupled to the telephone network; and
   an indoor cellular antenna for forming a coverage area at a second location, the second location being geographically remote from the first location and the indoor cellular antenna being communicatively coupled to the second base station such that mobile communications equipment located within the coverage area at the second location are communicatively coupled to the telephone network via the indoor cellular antenna and the second base station.

2. The system according to claim 1, further comprising an outdoor antenna and a frequency converter at the second location wherein the outdoor antenna at the second location is communicatively coupled to the second base station via wireless communications and wherein the outdoor antenna at the second location is communicatively coupled to the indoor antenna via the frequency converter.

3. The system according to claim 1, further comprising one or more additional indoor antennas at the second location communicatively coupled to the second base station.

4. The system according to claim 2, wherein the outdoor antenna at the second location is communicatively coupled to the first base station via wireless communications in a 2500 MHz frequency band and wherein the mobile communications equipment located within the coverage area of the indoor cellular antenna are communicatively coupled to the indoor cellular antenna using 850 MHz or 1900 MHz frequency band wireless communications.

5. The system according to claim 1, further comprising an outdoor antenna at the second location that is communicatively coupled to the second base station via wireless communications in a 850 MHz or 1900 MHz frequency band and wherein the mobile communications equipment located within the coverage area of the indoor cellular antenna are communicatively coupled to the indoor cellular antenna using the same frequency band wireless communications as are used to communicatively coupled the outdoor antenna at the second location to the second base station.

6. The system according to claim 5, wherein the same channel is used for communications between outdoor antenna at the second location and the second base station and for communications between the indoor cellular antenna and the mobile communications equipment.

7. The system according to claim 5, wherein different channels are used for communications between outdoor antenna at the second location and the second base station and for communications between the indoor cellular antenna and the mobile communications equipment.

8. The system according to claim 1, wherein the coverage area at the second location is within a first building and further comprising an second indoor cellular antenna for forming a coverage area at a third location within a second building, the third location being geographically remote from the first location and the indoor cellular antenna at the third location being communicatively coupled to the second base station such that mobile communications equipment located within the coverage area at the third location are communicatively coupled to the telephone network via the indoor cellular antenna and the base station.

9. The system according to claim 1, wherein the second base station is a low-power base station having a single transceiver.

10. The system according to claim 9, wherein the second base station is coupled to the telephone network via a backhaul using Internet protocol (IP) in which voice data is communicated in IP packets.

11. The system according to claim 9, wherein first base station is a high-power base station having one or more transceivers.

12. The system according to claim 1, wherein the first base station is coupled to the telephone network via a T1 or E1 backhaul.

13. The system according to claim 1, wherein the first and second base stations share site infrastructure.

14. The system according to claim 13, wherein the indoor cellular antenna is communicatively coupled to the second base station via the outdoor antenna thereby the outdoor antenna is shared by the first and second base stations.

15. The system according to claim 1, wherein the coverage area of the outdoor cellular antenna overlaps the coverage area of the indoor cellular antenna.

16. The system according to claim 15, wherein mobile communications equipment located within the coverage area of the outdoor cellular antenna are communicatively coupled to the outdoor cellular antenna using 850 MHz frequency band or 1900 MHz frequency band wireless communications.

17. The system according to claim 1, wherein a remote system at the second location comprises the indoor antenna and wherein the remote system is communicatively coupled to the second base station via a first communication link and further comprising an auxiliary communication link for communicating administrative information between the remote system and the first base station.

18. A system for providing dedicated capacity in a cellular network, comprising:
  a base station positioned at a first location and being communicatively coupled to a telephone network, the base station having one or more transceiver units dedicated to providing a first coverage area for direct communication with mobile communications equipment and one or more transceiver units dedicated to providing a second coverage area; and
  a remote system within the second coverage area, the remote system being communicatively coupled to the base station via the one or more transceiver units dedicated to providing the second coverage area and the remote system comprising an indoor cellular antenna for forming a third coverage area at a remote location, the remote location being geographically remote from the first location and the indoor cellular antenna being communicatively coupled to the base station such that mobile communications equipment located within the third coverage area are communicatively coupled to the telephone network via the indoor cellular antenna and the base station.

19. The system according to claim 1, wherein the first coverage area comprises a first number, n, of sectors and the second coverage area comprises a second number, m, of sectors.

20. The system according to claim 19, wherein the n sectors are each 120-degrees.

21. The system according to claim 20, wherein the m sectors are each 120-degrees.

22. The system according to claim 20, wherein the m sectors are omni-directional.

23. A system for providing dedicated capacity in a cellular network, comprising:
  a pico base station positioned at a first location and being communicatively coupled to a telephone network, the pico base station being a low-power base station having a single transceiver;
  a first indoor cellular antenna for forming a first coverage area at a second location within a first building, the second location being geographically remote from the first location and the first indoor cellular antenna being communicatively coupled to the pico base station such that mobile communications equipment located within the first coverage area are communicatively coupled to the telephone network via the first indoor cellular antenna and the base station; and
  a second indoor cellular antenna for forming a second coverage area at a third location within a second building, the third location being geographically remote from the first location and the second indoor cellular antenna being communicatively coupled to the pico base station such that mobile communications equipment located within the second coverage area are communicatively coupled to the telephone network via the second indoor cellular antenna and the pico base station.

24. The system according to claim 23, further comprising:
  an outdoor antenna and a frequency converter at the second location wherein the outdoor antenna at the second location is communicatively coupled to the pico base station via wireless communications and wherein the outdoor antenna at the second location is communicatively coupled to the first indoor antenna via the frequency converter; and
  an outdoor antenna and a frequency converter at the third location wherein the outdoor antenna at the third location is communicatively coupled to the pico base station via wireless communications and wherein the outdoor antenna at the third location is communicatively coupled to the second indoor antenna via the frequency converter.

25. The system according to claim 24, wherein the outdoor antenna at the second location and the outdoor antenna at the third location are communicatively coupled to the base station via wireless communications in a 2500 MHz frequency band and wherein the mobile communications equipment located within the coverage area of the first and second indoor cellular antennas are communicatively coupled to the respective indoor cellular antenna using 850 MHz or 1900 MHz frequency band wireless communications.

26. The system according to claim 23, further comprising one or more additional indoor antennas at the second location communicatively coupled to the pico base station.

27. The system according to claim 23, further comprising a macro base station at the first location, the macro base station being a high-power base station having multiple transceivers and being communicatively coupled to the telephone network and the macro base station having an outdoor cellular antenna for forming a coverage area.

28. The system according to claim 27, wherein the pico base station is coupled to the telephone network via a backhaul using Internet protocol (IP) in which voice data is communicated in IP packets.

29. The system according to claim 27, wherein the macro base station is coupled to the telephone network via a T1 or E1 backhaul.

30. The system according to claim 27, wherein the pico and macro base stations share site infrastructure.

31. The system according to claim 27, wherein the coverage area of the outdoor cellular antenna overlaps the coverage area of the indoor cellular antenna at the second location.

32. A method for providing dedicated capacity in a cellular network, the cellular network including a high-power base station at a first location communicatively coupled to a telephone network and having multiple transceivers and having at least one outdoor antenna forming a coverage area at the first location, the method comprising:

adding a low-power base station at the first location; and adding an indoor cellular antenna for forming a coverage area at a second location, the second location being geographically remote from the first location and the indoor cellular antenna being communicatively coupled to the low-power base station such that mobile communications equipment located within the coverage area are communicatively coupled to the telephone network via the indoor cellular antenna and the low power base station.

33. The method according to claim 32, further comprising adding an outdoor antenna and a frequency converter at the second location wherein the outdoor antenna at the second location is communicatively coupled to the low-power base station via wireless communications and wherein the outdoor antenna at the second location is communicatively coupled to the indoor antenna via the frequency converter.

34. The method according to claim 32, further comprising adding one or more additional indoor antennas at the second location communicatively coupled to the low-power base station.

35. The method according to claim 32, wherein the outdoor antenna at the second location is communicatively coupled to the low-power base station via wireless communications in a 2500 MHz frequency band and wherein the mobile communications equipment located within the coverage area of the indoor cellular antenna are communicatively coupled to the indoor cellular antenna using 850 MHz or 1900 MHz frequency band wireless communications.

* * * * *

UNITED STATES PATENT AND TRADEMARK OFFICE
CERTIFICATE OF CORRECTION

PATENT NO. : 7,844,273 B2  
APPLICATION NO. : 11/486627  
DATED : November 30, 2010  
INVENTOR(S) : Scheinert Page 1 of 1

It is certified that error appears in the above-identified patent and that said Letters Patent is hereby corrected as shown below:

Under (56) References Cited Section, U.S. Patent Documents, page 2, please insert the following references:

| --2002/0037054 | A1 | 3/2002  | Schurig-- |
| --2004/0066326 | A1 | 4/2004  | Knapp-- |
| --2005/0176368 | A1 | 8/2005  | Young et al.-- |
| --2005/0227710 | A1 | 10/2005 | Yamashita-- |
| --2006/0025158 | A1 | 2/2006  | Leblanc-- |
| --2006/0094470 | A1 | 5/2006  | Wake-- |

Signed and Sealed this  
Eighth Day of February, 2011

David J. Kappos  
*Director of the United States Patent and Trademark Office*